United States Patent [19]
Hattori

[11] Patent Number: 5,262,705
[45] Date of Patent: Nov. 16, 1993

[54] IC DEVICE FOR DRIVE CONTROL OF SMALL HARD DISK DRIVE UNIT

[75] Inventor: Masayuki Hattori, Tokyo, Japan

[73] Assignee: NEC Corporation, Tokyo, Japan

[21] Appl. No.: 914,270

[22] Filed: Jul. 15, 1992

[30] Foreign Application Priority Data

Jul. 15, 1991 [JP] Japan .................................. 3-172855

[51] Int. Cl.⁵ .............................................. G05F 5/00
[52] U.S. Cl. .................................... 318/479; 318/500; 318/504
[58] Field of Search ................ 318/434, 449, 459, 479, 318/500, 504, 530; 323/299; 307/116; 340/540; 363/74, 79; 388/903, 916

[56] References Cited
U.S. PATENT DOCUMENTS 5,204,593  4/1993  Ueki ..................................... 318/254
5,212,797  5/1993  Miyake et al. ....................... 395/750

Primary Examiner—Bentsu Ro
Attorney, Agent, or Firm—Laff, Whitesel, Conte & Saret

[57] ABSTRACT

Here is disclosed an IC for controlling the spindle motor of a small hard disk drive unit, characteristic in being provided with a voltage detection circuit for a control circuit driving power source, responsive to the voltage at the connecting terminal of the control circuit driving power source for generating a signal to control the operation of the spindle motor; a voltage detection circuit for a motor driving power source, responsive to the voltage at the connecting terminal of the motor driving power source for controlling the operation of the motor; and further provided with a logic circuit for keeping valid the output signal of the voltage detecting circuit for said motor driving power source from the time the voltage at the motor driving power source terminal rises above a prescribed voltage higher than the upper limit of the prescribed voltage range of the control circuit power source until the time it falls below another prescribed voltage lower than the lower limit of said prescribed voltage range.

The IC can be used in a single voltage mode, in which a single voltage power source corresponding to the control circuit driving power source is connected to the control circuit power source terminal and the motor driving power source terminal, or in a dual voltage mode, in which power sources of two different voltages can be connected to these power source terminals, it increases the freedom of design.

5 Claims, 4 Drawing Sheets

IC DEVICE FOR DRIVE CONTROL OF SMALL HARD DISK DRIVE UNIT

BACKGROUND OF THE INVENTION

1. Field of the Invention

The present invention relates to a monolithic IC for controlling the spindle motor of a small hard disk drive (HDD) unit, i.e. a motor drive control IC (HDD drive IC) to which power for driving the motor and power for a motor controlling circuit are supplied from different terminals.

2. Description of the Prior Art

For an HDD driving IC, it is usual to supply from different connecting terminals on an IC chip power for driving a spindle motor (motor driving power) and power for a control driving circuit (control circuit driving power) for controlling the motor. This is intended to prevent faulty operation of the control circuit due to a large current flowing to the spindle motor.

While the voltage of motor driving power is usually 5 V or 12 V (or 24 V in rare cases), control circuit driving power is usually 5 V. If the motor driving power voltage is set at 5 V, the same as the control circuit driving power voltage, it is necessary, besides taking adequate measures against faulty operation, to generate an interrupt signal to interrupt power supply to the motor and the output stage of the control circuit when the common power source voltage, which is supposed to be 5 V, drops to 4 V or below, and to generate a brake signal to brake the motor when the voltage drops to 2 V or even below, so that every part of the HDD unit can operate normally and smoothly.

If the voltage of motor driving power is set at 12 V and that of control circuit driving power at 5 V, besides the interrupt signal and the brake signal, another interrupt signal to turn off the power supply to the motor and the output stage of the control circuit is generated in response to a drop of the motor driving power voltage to 10 V or below and another brake signal is generated in response to a drop of the control circuit driving power voltage to 3 V or below. These control circuit and motor operate in response to the logical sum of the interrupt signal and brake signal corresponding to the aforementioned power voltage of 5 V or 12 V.

Since the connecting terminal to the motor driving power source and that to the control circuit driving power source are connected in common on an IC chip when the voltage of motor power driving power and that of control circuit driving power are set at said common voltage of 5 V, a source voltage detecting circuit is composed of a circuit operating on 5 V power, connected to these commonly connected terminals.

If the voltage of motor driving power is set at 12 V and that of control circuit driving power, at 5 V, a source voltage detecting circuit is composed of a circuit operating on 12 V power, connected to the motor power connecting terminal, and another source voltage detecting circuit is composed of a circuit operating on 5 V power, connected to the control circuit power connecting terminal, the output of an OR circuit taking the logical sum of the output signals of these two source voltage detecting circuits being used as the source voltage detection output.

The aforementioned source voltage detecting circuit operating on 5 V power outputs a detection signal which takes on an active level in response to a drop of the voltage of the control power source terminal to 4 V or below, and the source voltage detecting circuit operating on 12 V power outputs a detection signal which takes on an active level in response to a drop of the voltage of the motor driving power source terminal to 10 V or below.

If an HDD unit driving IC in which these source voltage detecting circuits, one operating on 5 V power and the other on 12 V, are used in combination is to be used with a single 5 V power source by commonly connecting the control circuit power source connecting terminal and the motor power source connecting terminal, the output of said OR circuit always takes on an active level because detection signals of the active level are constantly supplied from the circuit operating on 12 V power, and the output of the circuit operating on 5 V is not reflected on the output of the OR circuit, inviting faulty operation. In order to use such an HDD unit driving IC with a single 5 V power source, it is necessary, for instance, to cut off the output wiring of the voltage detecting circuit operating on 12 V power. If this is difficult to accomplish, it is necessary to provide a circuit equipped with only a source voltage detecting circuit operating on 5V power. Therefore, two kinds of circuit are required, one for the single 5 V power source and the other for two power sources of 5 V and 12 V, resulting in a correspondingly limited freedom of design.

BRIEF SUMMARY OF THE INVENTION

Object of the Invention

An object of the present invention, therefore, is to provide an HDD unit driving IC which can be used irrespective of whether the motor driving power source and the control circuit driving power source use two different voltages or a single voltage and can thereby increase the freedom of design.

Summary of the Invention

According to the invention, there is provided an HDD unit driving IC provided with a first voltage detecting circuit for generating a first detection signal for controlling the operation of a spindle motor in response to the voltage of a first terminal connected to a power source for driving the motor; a second voltage detecting circuit for generating a second detection signal for controlling the operation of the motor in response to the voltage of a second terminal connected to another power source for driving a control circuit to control the motor; and control signal generating means for transmitting (and thereby making valid) the first detection signal to one of the input terminals of an output logical sum circuit during a period from the time, the voltage at the first terminal surpasses a prescribed level higher than the upper limit of the prescribed voltage range of the power source for driving the control circuit until the time the voltage reaches another prescribed value lower than the lower limit of the prescribed voltage range, and supplying from the output logical sum circuit to the control circuit a sum representing the logical sum of this valid first detection signal and the second detection signal.

This IC, when in a single voltage mode in which a single voltage power source corresponding to the control circuit driving power source is connected to said first and second terminals, invalidates the output signal of said first voltage detecting circuit (first detection signal) (reduces the input terminal of said output logical sum circuit to an inactive level) and controls the driving of the motor with only the output signal of the second voltage detecting circuit (second detection signal), or when in a dual voltage mode in which power sources of two different voltages are connected to said two terminals, validates the output signal of the first voltage detecting circuit as well over the prescribed voltage range stated above, and controls the driving of the motor with the output signals of both the first and the second voltage detecting circuits. Thus this IC can be used as it is both in the single voltage mode and in the dual voltage mode, and accordingly can help increase the freedom of design.

BRIEF DESCRIPTION OF THE DRAWINGS

The above-mentioned and other objects, features and advantages of the present invention will become more apparent from the following detailed description taken in conjunction with the accompanying drawings, wherein.

DETAILED DESCRIPTION OF THE PREFERRED EMBODIMENT

Figure 1:
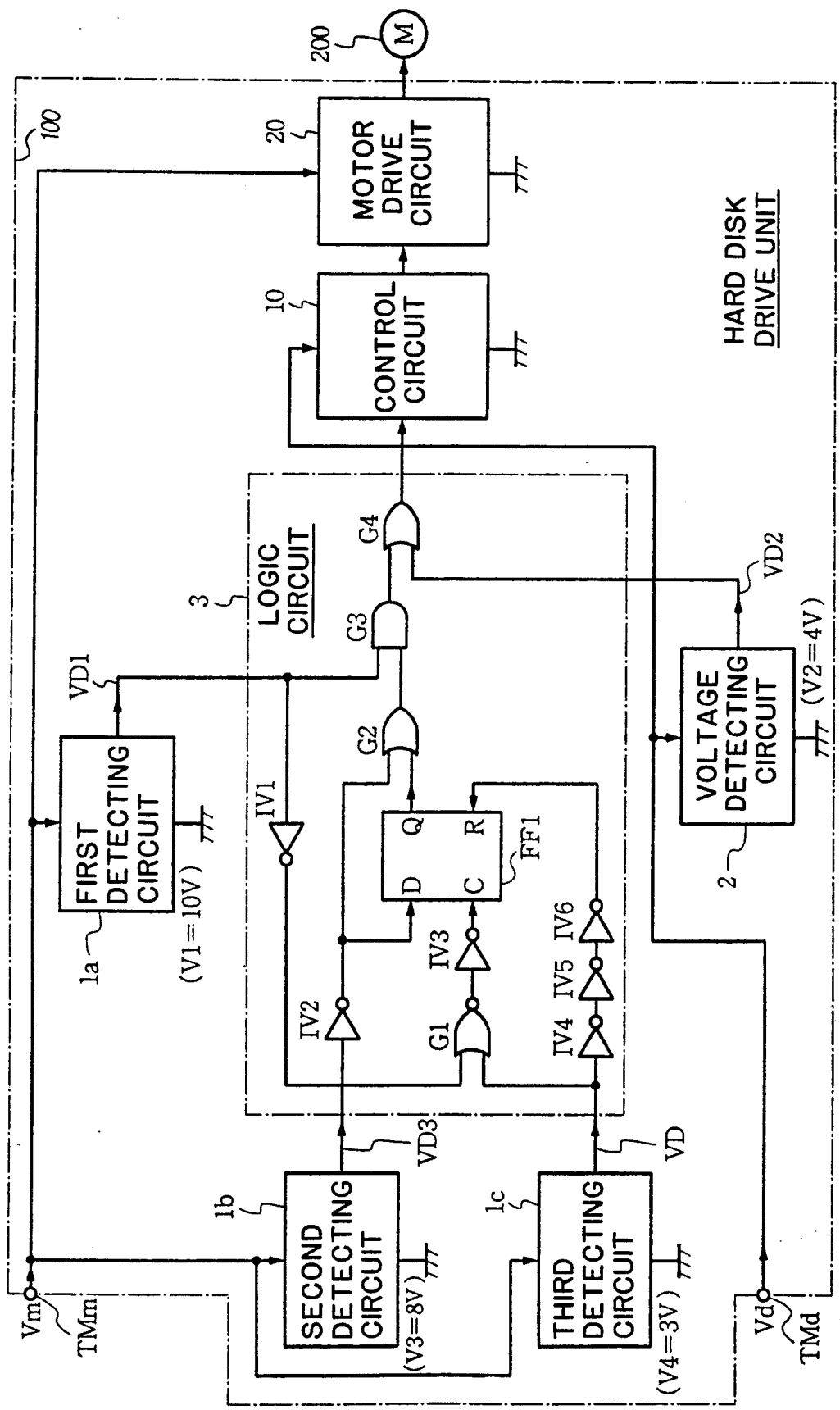
FIG. 1 is a block diagram including a partial circuit diagram of a preferred embodiment of the invention.

An HDD unit driving IC 100 illustrated in FIG. 1, which is a preferred embodiment of the present invention, is provided with a first motor driving power source voltage detecting circuit 1a for generating a first detection signal VD1 which takes on an active level when the voltage Vm of a motor power source connected to a motor driving power source connecting terminal TMm is lower than a first reference voltage V1 (for instance 10 V when the regular voltage is 12 V); a second control circuit power source voltage detecting circuit 2 for generating a second detection signal VD2 which takes on an active level when the voltage Vd of the control circuit power source connecting terminal TMd is lower than a second reference voltage V2 (for instance 4 V) set lower than the lower limit of a prescribed varying range; a second motor driving power source voltage detecting circuit 1b for generating a third detection signal VD3 which takes on an active level when said voltage Vm is lower than a third reference voltage V3 (for instance about 8 V) set between the upper limit of the prescribed varying range of the control circuit power source and the aforementioned first reference voltage V1; a third motor driving power source voltage detecting circuit 1c for generating a fourth detection signal VD4 which takes on an active level when said voltage Vm is lower than a fourth reference voltage V4 (for instance about 3 V) set lower than the lower limit of the prescribed varying range of the voltage Vd of the aforementioned control circuit power source; a logic circuit 3 which receives the supply of these detection signals VD1, VD2, VD3 and VD4; a control circuit 10 which receives the output of the circuit 3 and the voltage Vd; and a motor drive circuit 20 which receives the output of the circuit 10 and the voltage Vm and supplies a drive voltage to a motor 200.

The logic circuit 3 is provided with a NOR gate G1 which receives the first detection signal VD1 at one of its input terminals via a first inverter IV1 and the fourth detection signal VD4 at the other of its input terminals; a flip-flop circuit FF1 which receives the output of the gate G1 at its clock input terminal C via an inverter IV3, the third detection signal VD3 at its data input terminal D via an inverter IV2, and the fourth detection signal VD4 at its reset input terminal R via inverters IV4, IV5 and IV6; first OR gate G2 which receives the output from the output terminal Q of the flip-flop circuit FF1 at one of its input terminals and the third detection signal VD3 at the other of its input terminals via the inverter IV2; an AND gate G3 which receives the output of the gate G2 and the first detection signal VD1 at its input terminals; and a second OR gate G4 which receives the output of the gate G3 and the detection signal VD2. This configuration makes the logic circuit 3 responsive to the first, third and fourth detection signals VD1, VD3 and VD4 for transmitting the first detection signal VD1 to the output terminal of the gate G3 (validating the first detection signal VD1) during the period from the time the voltage Vm rises above the third reference voltage V3 and until it drops to the fourth voltage V4, and supplying a control signal to the control circuit 10 via the gate G4 which takes the logical sum of the detection signal VD1 and the second detection signal VD2.

The control circuit 10 receives, besides said control signal from the OR gate G4, control signals from other circuits (including an operating mode switching signal, an excitation phase switching signal, and a current switching signal for the motor), supplies load/operation control signals for controlling the turning on-and-off operation and turning position of the motor 200, and controls the motor 200 with the motor drive circuit 20.

Figure 2:
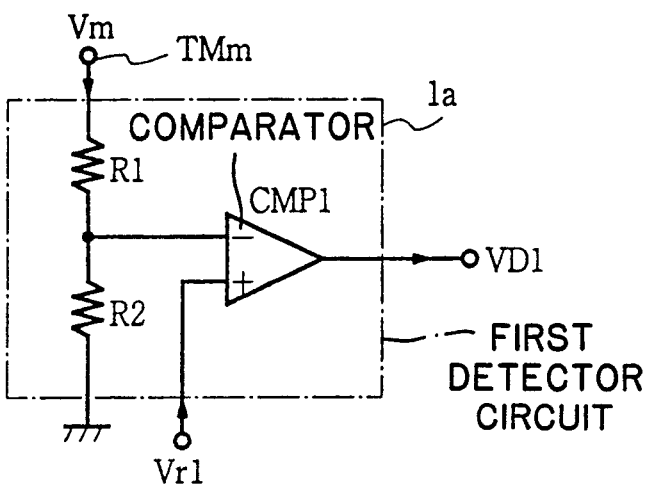
FIG. 2 is a circuit diagram of a part of this embodiment.

Referring now to FIG. 2, the first detection circuit 1a is provided with resistances R1 and R2 connected in series between the terminal TMm and a ground potential point, and a comparator CMP1 of which the negative input end ($-$) is connected to the connecting point between the resistances R1 and R2 and the positive input end ($+$) is connected to the reference voltage source of a voltage Vr1. Here, supposing that Vr1=2.4 V, R1=135 k$\Omega$ and R2=45 k$\Omega$, the voltage V1 will be 9.6 V, and the first detection signal VD1 will take on a high level (active level) when the voltage Vm of the motor power source is below 9.6 V and a low level when it is above 9.6 V. This first detection signal VD1 indicates that the voltage of the motor power source, which is normally 12 V, is at an abnormal level below 9.6 V.

Figure 3:
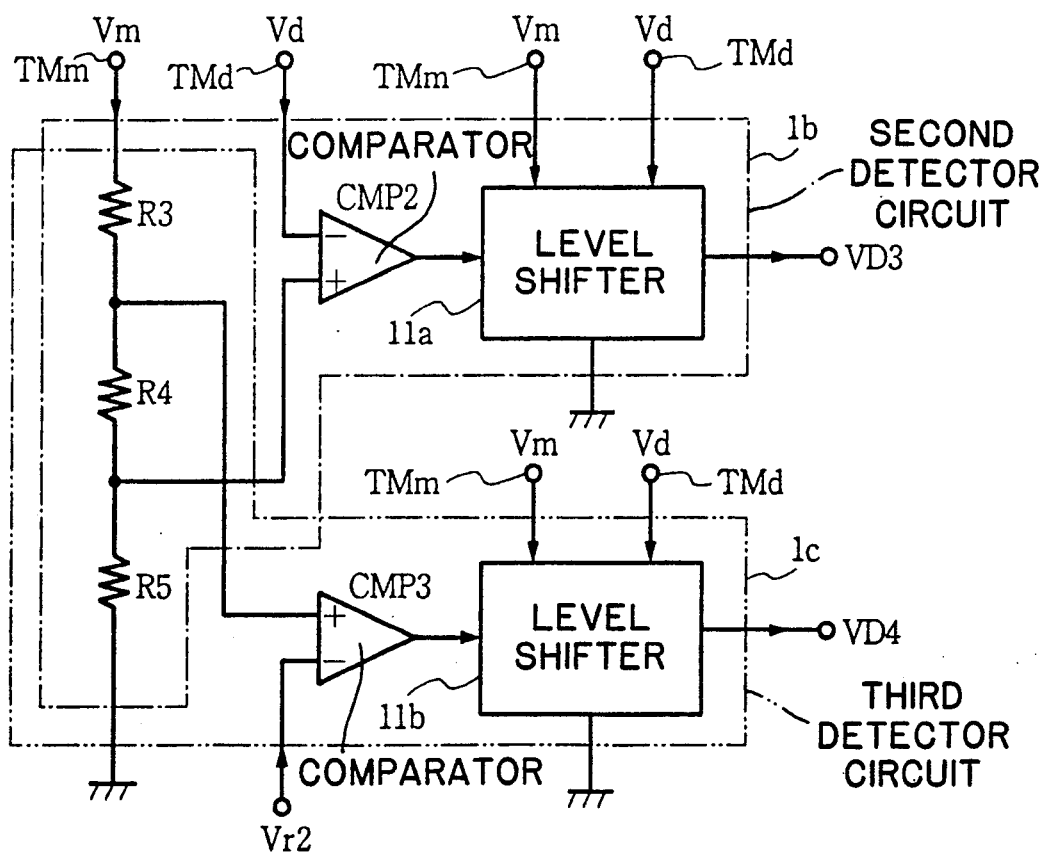
FIG. 3 is a circuit diagram of another part of this embodiment.

Referring to FIG. 3, the second detection circuit 1b is provided with resistances R3, R4 and R5 connected in series between the terminal TMm and the ground potential point, and a comparator CMP2 of which the positive input end ($+$) is connected to the connecting point between the resistances R4 and R5 and the negative input end ($-$) is connected to the terminal TMd of said voltage Vd, and a level shifter 11a for shifting the level of the output signal of the comparator CMP2 from that of said voltage Vm to that of Vd and inverting its polarity. Similarly, the third detection circuit 1c is provided with the serial circuit of the resistances R3, R4 and R5 uses in common with the second detecting circuit 1b, a comparator CMP3 of which the positive input end is connected to the connecting point between the resistances R3 and R4 and the negative input end is connected to the reference voltage source of a voltage Vr2, and a level shifter 11b for shifting the level of the output signal of the comparator CMP3 from that of Vm to that of ov Vd and inverting its polarity.

Here, supposing that Vd=5.0 V, Vr2=2.4 V, R3=R4=40 kΩ, and R5=120 kΩ, the third voltage V3 will be 8.3 V, and the fourth voltage V4, 3.0 V. As a result, the third detection signal VD3 will take on a high level (active level) when the voltage Vm is below 8.3 V and a low level when it is above 8.3 V, and the detection signal VD4 will take on a high level (active level) when the voltage Vm is above 3.0 V and a low level when it is above 3.0 V. The third detection signal VD3 is a signal to validate the first detection signal VD1 in a range when the voltage Vm, when rising, exceeds 8.3 V, and the fourth detection signal VD4, a signal to keep the first detection signal VD1 valid until the voltage Vm, when falling, reaches 3.0 V and brake the motor when the voltage Vm falls beyond 3.0 V.

Figure 4:
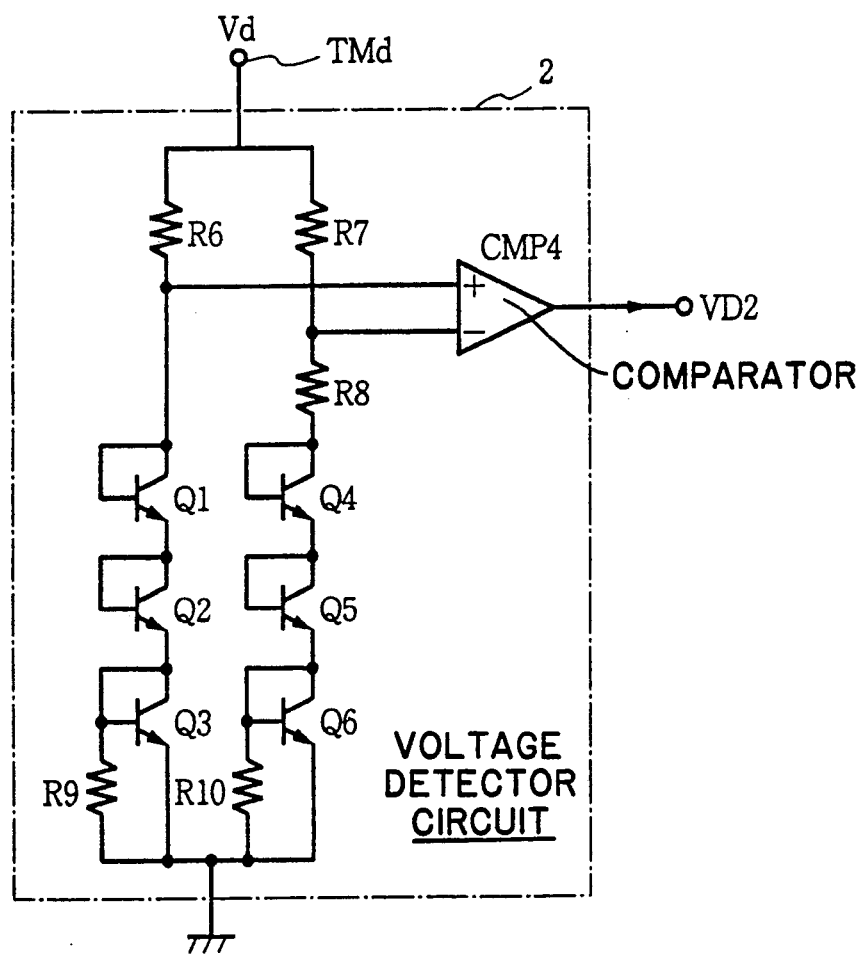
FIG. 4 is a circuit diagram of still another part of this embodiment.

Referring now to FIG. 4, the voltage detecting circuit for the control circuit source voltage is provided with resistances R6 and R7 of each of which one of the terminals is connected to the terminal TMd for connecting the control circuit power source; transistors Q1, Q2 and Q3 connected in series by common base and collector connection and inserted between the other terminal of the resistance R6; transistors Q4, Q5 and Q6 similarly connected in common base and collector connection together with a resistor R8 and inserted between the other terminal of the resistance R7 and the ground potential point; resistors R9 and R10 connected between the bases and emitters of the transistors Q3 and Q6, respectively; and a comparator CMP4 whose positive input and (+) and negative input end (−) are respectively connected to the connecting point between the resistance R6 and said transistor Q1 and the connecting point between the resistances R7 and R8 and from whose output end is supplied said detection signal VD2. As is evident from this configuration, this voltage detection circuit 2 consists of a band gap type reference voltage generating circuit, and is capable of stable voltage detection against temperature variations. The level varying point of the voltage detection signal VD (i.e. said second reference voltage V2), which is the output of the circuit 2, is determined by the voltages between the bases and emitters of the transistors Q1 through Q6, the ratio between the resistances R6 and R7, and that between the resistances R7 and R8, and its value is 4 V. Thus, this detection output VD2 takes on a high level (active level) when the voltage Vd is below 4 V, and thereby indicates the deviation of the voltage of the control power source, which is normally 5 V, to abnormally drop to below 4 V.

Figure 5:
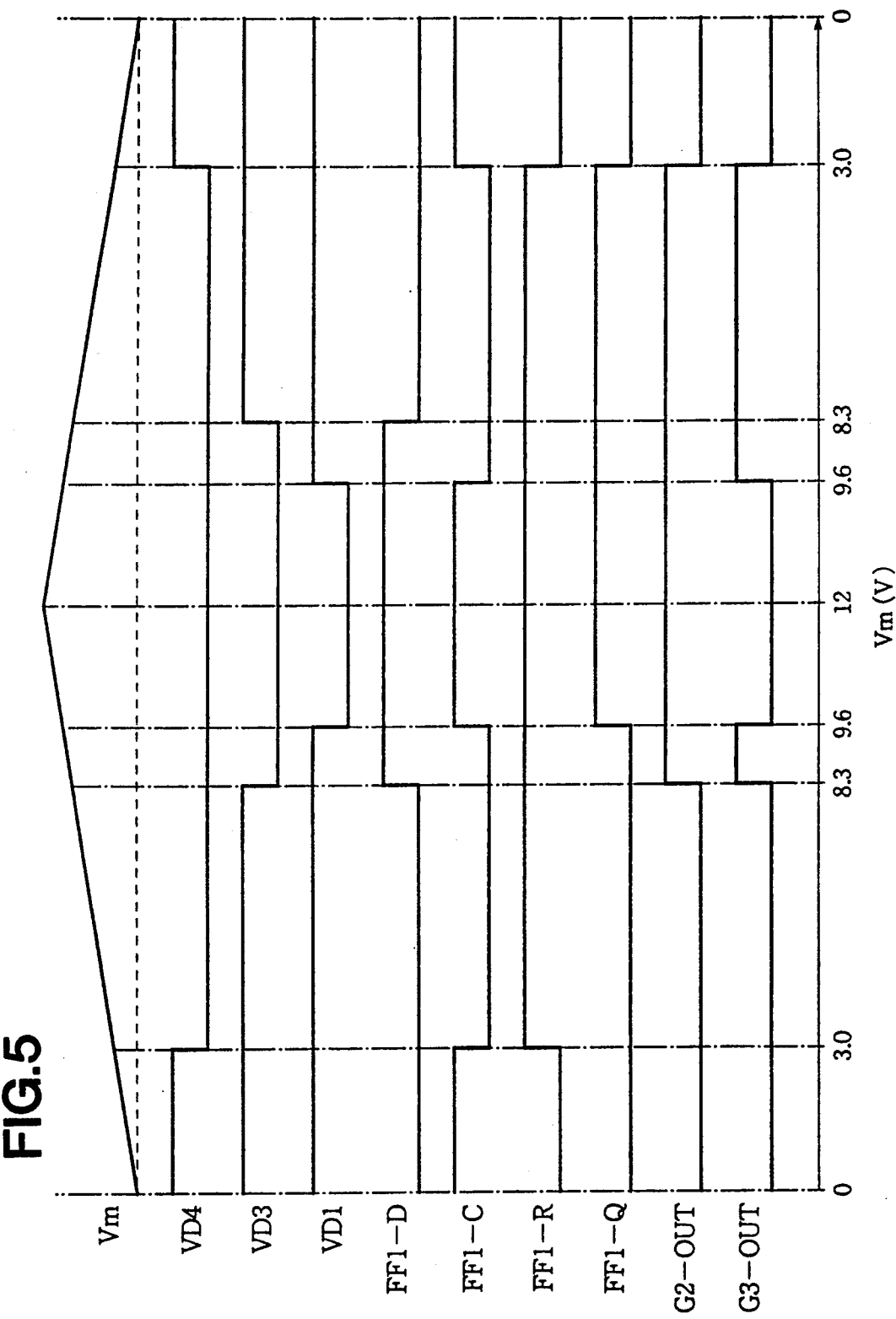
FIG. 5 shows signal waveforms in different parts of this embodiment for illustrating the description of its operation.

Next will be described the operation of this preferred embodiment with reference to FIG. 5. FIG. 5 illustrates signal waveforms in different parts which appear when the motor power is connected to the terminal TMm for connecting the motor drive power source and its voltage Vm rises from 0 V to 12 V and thereafter declines from 12 V to 0 V.

During the period of the rise of the voltage Vm from 0 V to reach 3 V, the first, third and fourth detection signals VD1, VD3 and VD4 are at their respective high levels (although the second voltage detection signal VD2 also is at its high level, it is not shown in FIG. 5).

When the voltage Vm reaches 3 V, first the fourth detection signal VD4 falls to its low level with the result that the flip-flop circuit FF1 is reset through the inverters IV4, IV5 and IV6. At this time, since the flip-flop circuit FF1 maintains its initial stage, its output remains at its low level.

When the voltage Vm rises to 8.3 V, the third detection signal VD3 falls to its low level with the result that the output signal of the inverter IV2 rises to its high level, and this high level signal is transmitted to one of the input ends of the AND gate G3 through the OR gate G2, while the first detection signal VD1 is validated, and its high level, passing the AND gate G3 and the OR gate G4, is transmitted to the control circuit 10. This high level indicates that the motor power source still remains within the abnormal voltage range. Further, the high level output of the inverter IV2 is also supplied to the data input terminal D of the flip-flop circuit FF1.

When the voltage Vm further rises to reach 9.6 V, the first detection signal VD1 falls to its low level with the result that the signals to the control circuit also fall to their respective low levels, indicating that the motor power source has come out of the abnormal voltage range. Meanwhile, the low level of the first detection signal VD1 is turned by the inverter IV1 into the high level, which passes the NOR gate G1 and the inverter IV3 to make the level at the clock input terminal C of the flip-flop circuit FF1 high. In response to this, the flip-flop circuit FF1 latches the high level transmitted to its data input terminal D to make the level at its output terminal Q high.

This state does not change until the voltage Vm, after rising still further to reach 12 V and then beginning to fall, again reaches 9.6 V.

When the voltage Vm again reaches 9.6 V, the first detection signal VD1 rises to its high level. Along with this, the signals to the control cirlcuit 10 also rise to their respective high levels, indicating that the motor power source has taken on an abnormal voltage of 9.5 V or below. While the level at the clock input terminal C of the flip-flop circuit FF1 also changes, the level of the data it holds does not, and the output of its output terminal Q maintains its high level.

When the voltage Vm further falls to reach 8.3 V, the third detection signal VD3 rises to its high level. While the data input terminal D of the flip-flop circuit FF1 falls to its low level at this time, its output terminal Q maintains its high level because the clock input terminal C remains at its low level. As a result, one of the input ends of the AND gate G3 is kept at its high level to continue the state in which the first detection signal VD is valid. This state is maintained until the voltage Vm falls to 3 V.

When the voltage Vm falls still further to reach 3 V, the fourth detection signal VD4 rises to its high level. As a result, the clock input terminal C of the flip-flop circuit FF1 changes to its high level, in response to which the low level of the data input terminal D is latched, and the output terminal Q changes to its low level. Since the third detection signal VD3 is at its high level and the output of the inverter IV2 is at its low level then, both inputs to the OR gate G2 are at their respective low levels and, accordingly, with its output, i.e. one of the inputs to the AND gate G3, falling to its low level and the first detection signal VD being invalidated (the output of the AND gate G3 is at its low level irrespective of the level of VD1), the transmission to the control circuit 10 is stopped.

As described above, the first detection signal VD1 is valid from the time the voltage Vm has risen to and beyond 8.3 V until it falls to 3 V. The reason why the first detection signal VD1 is kept valid until the voltage Vm falls to 3 V is to enable the control circuit 10 to prepare for the next action, such as braking for instance, toward the motor to be taken when the voltage Vm falls to or beyond 3 V.

In this manner, the voltage Vm when the motor power source, which is normally 12 V unequal to that of the control circuit power source (which is usually 5 V), is detected accurately and without fail, so that the motor can be smoothly controlled.

While the first detection signal VD1 of said first detection circuit 1a (operating on 12 V power) is subjected to the control of validation and invalidation, the second detection signal VD2, which is the output of the control circuit power source voltage detecting circuit 2, is not subjected to such control, and instead is supplied as it is to the control circuit 10 via the OR gate G4.

Next will be described a case in which the terminals TMd and TMm are connected to a single 5 V power source.

When the voltage Vm at the terminal TMm begins to rise and reaches 3 V, the fourth detection signal VD4 from the third detecting their 1c varies from its high to low level with the result that the flip-flop circuit FF1 is reset and its output terminal Q retains the low level state.

Since the third detection signal VD3 from the second detecting circuit 1b is in its high level state then, the output of the inverter IV2 falls to its low level, and the output of the OR gate G2 to which this low level and the low level signal from the output terminal Q of the flip-flop circuit FF1 are inputted also falls to its low level. As a result, the detection signal VD1, which is the output of the first detecting circuit 1a (operating on 12 V power) is invalidated by the AND gate G3.

Even when the voltage Vm further rises to reach its highest level 5 V, the first detection signal VD1 remains invalid because the states of the detecting circuits 1a, 1b and 1c do not change.

When the voltage begins to fall from 5 V and reaches 3 V, while the fourth detection signal VD4 from the third detecting circuit 1c rises to its high level, the state of the flip-flop circuit FF1 does not change, and its output terminal Q remains at its low level. Since other parts do not change either, the first detection signal VD1 remains invalid. This state continues until the voltage Vm falls to 0 V.

Thus, the output signal of the first detecting signal 1a (operating on 12 V power) is always in an invalid state against voltage changes of the 5 V power source.

Therefore, the output CVD2 of the detecting circuit 2 (operating on 5 V power) passes the OR gate G4, and is supplied as it is to the control circuit 10, so that this output drives and controls the motor.

Any drive control circuit of this kind according to the prior art, where it is used with separate power sources differing in voltage (for instance 5 V and 12 V) connected to its terminals TMd and TMm, has to be a circuit provided with a source voltage detecting circuit operating on 5 V power, corresponding to the detecting circuit 2, another source voltage detecting circuit operating on 12 V, corresponding to the detecting circuit 1a, and an OR gate for supplying the logical sum of the outputs of these source voltage detecting circuits. In this drive control circuit, if a single 5 V power source is connected to the terminals TMm and TMd, the output signal of the voltage detecting circuit operating on 12 V power will always be at its high level within the normal voltage range of operation on 5 V power, and accordingly the output signal of the voltage detecting circuit operating on 5 V cannot be reflected in the output signal of the drive control circuit. In order to solve this problem, it is necessary, for instance, to cut off the wiring. If such a disposition is difficult, separate ICs, one for dual voltage operation and the other for single voltage operation, have to be designed and fabricated. By contrast the present invention, as it provides for the arrangement of motor control signal generating means including the second and third voltage detecting circuits 1b and 1c and the logic circuit 3, is compatible with both single voltage operation and dual voltage operation. The freedom of design is correspondingly increased.

Whereas the voltage of the control circuit power source is supposed to be 5 V and those of the motor driving power source are 5 V and 12 V in the above-described preferred embodiment, it should be apparent to persons skilled in the art that these voltages can be at any other desired levels. For instance, where the voltage of the motor driving power source is often 24 V, the first reference voltage for the first voltage detecting circuit can be set at 20 V, and that for the second voltage detecting circuit, at 17 V.

Furthermore, although the invention has been described with reference to a specific embodiment, this description is not meant to be construed in a limiting sense. Various modifications of the disclosed embodiment, as well as other embodiments of the invention, will become apparent to those skilled in the art upon reference to the description of the invention. It is therefore contemplated that the appended claims will cover any such modifications or embodiments as fall within the true scope of the invention.

What is claimed is:

1. A drive control circuit for controlling the spindle motor of a small hard disk drive (HDD) unit, comprising:
    a first voltage detecting circuit for generating a first detection signal for controlling the operation of the spindle motor of the small HDD unit in response to the voltage of a first terminal connected to a power source for driving the motor;
    a second voltage detecting circuit for generating a second detection signal for controlling the operation of said motor in response to the voltage of a second terminal connected to another power source for driving a control circuit to control said motor; and
    control signal generating means for keeping valid said first detection signal during a period from the time the voltage at said first terminal surpasses a prescribed level higher than the upper limit of the prescribed voltage range of the power source for driving the control circuit until the time said voltage reaches another prescribed value lower than the lower limit of the prescribed voltage range, and supplying said control circuit with the logical sum of the valid first detection signal and said second detection signal.

2. A drive control circuit, as claimed in claim 1, wherein said first voltage detecting circuit consists of a circuit for generating said first detection signal which takes on an active level when the voltage at said first terminal is below a first reference voltage of a prescribed level; said second voltage detecting circuit consists of a circuit for generating said second detection signal which takes on an active level when the voltage at said second terminal is below a second reference voltage which is below the lower limit of the prescribed voltage range of said control circuit driving power source; and said control signal generating means is provided with means for generating a third detection signal which takes on an active level when the voltage at said first terminal is lower than a third reference voltage which is between the upper limit of the prescribed voltage range of said control circuit driving power source and said first reference voltage, means for generating a fourth detection signal VD4 which takes on an active level when the voltage at said second terminal is lower than a fourth reference voltage which is between the lower limit of the prescribed voltage range of said control circuit driving power source and said second reference voltage, and a logic circuit responsive to said first, third and fourth detection signals for keeping said first detection signal valid from the time the voltage at said first terminal surpasses said third reference voltage until it falls to said fourth reference voltage and supplying the logical sum of this valid first detection signal and said second detection signal to said control circuit.

3. A drive control circuit, as claimed in claim 2, wherein the normal voltage at said first terminal is set at 12 V; said first reference voltage; at about 10 V; the center value of said prescribed voltage range of said control circuit power source, at 5 V; said second reference voltage, at about 4 V; said third reference voltage, at about 8 V; and said fourth reference voltage; at about 3 V.

4. A drive control circuit, as claimed in claim 2, wherein the normal voltage at said first terminal is set at 24 V; said first reference voltage, at about 20 V; and said third reference voltage, at about 17 V.

5. A drive control circuit, as claimed in claim 2, wherein said logic circuit comprises:
- a first inverter circuit for inverting the level of said first detection signal,
- a second inverter circuit for inverting the level of said third detection signal,
- a plurality of third inverter circuits connected in cascade to each other so as to invert the level of said fourth detection signal,
- a NOR gate receiving with a pair of input terminals said fourth detection signal and the output signal of said first inverter circuit;
- a fourth inverter circuit for inverting the level of the output signal of said NOR gate,
- a flip-flop circuit receiving the supply of the output signal of said second inverter circuit at its data input terminal, the supply of the output signal of said fourth inverter circuit at its clock input terminal, and the supply of the output signal of said third inverter circuit at its reset input terminal,
- a first OR gate circuit receiving with a pair of input terminals the output signal of said flip-flop circuit and the output signal of said second inverter circuit;
- an AND gate circuit receiving the supply of the output signal of said first OR gate circuit and of said first detection signal; and
- a second OR gate circuit receiving the supply of the output signal of said AND gate circuit and of said second detection signal.

* * * * *